United States Patent
Klingler et al.

(12) 
(10) Patent No.: US 7,045,003 B2
(45) Date of Patent: May 16, 2006

(54) PREGELATINIZED STARCHES AND PROCESSES FOR THEIR PRODUCTION

(75) Inventors: Rudolf Klingler, Berlin (DE); Karl-Georg Busch, Kleinmachnow (DE)

(73) Assignee: Bayer Cropscience GmbH, Berlin (DE)

( * ) Notice: Subject to any disclaimer, the term of this patent is extended or adjusted under 35 U.S.C. 154(b) by 180 days.

(21) Appl. No.: 10/322,758

(22) Filed: Dec. 19, 2002

(65) Prior Publication Data

US 2005/0005928 A1 Jan. 13, 2005

(30) Foreign Application Priority Data

Dec. 21, 2001 (DE) .......................... 101 63 541

(51) Int. Cl.
*C08B 30/00* (2006.01)
*C08L 3/02* (2006.01)

(52) U.S. Cl. .............................. 106/206.1; 106/501.1; 426/471; 426/573; 426/661; 127/32; 127/71; 536/102

(58) Field of Classification Search ............... 536/102; 106/206.1, 501.1; 426/471, 573, 661; 127/32, 127/71

See application file for complete search history.

(56) References Cited

U.S. PATENT DOCUMENTS

| 3,086,890 A | 4/1963 | Sarko et al. |
| 3,128,209 A | 4/1964 | Gemino et al. |
| 3,515,591 A | 6/1970 | Feldman et al. |
| 3,607,394 A | 9/1971 | Germino et al. |
| 4,251,556 A | 2/1981 | Burkwall, Jr. et al. |

FOREIGN PATENT DOCUMENTS

| EP | 108833 | 5/1984 |
| EP | 1179298 | 2/2002 |
| EP | PCT EP 02/06265 | 6/2002 |
| EP | 1 245 577 | 10/2002 |
| WO | WO 92/11375 | 7/1992 |
| WO | WO 95/07355 | 3/1995 |
| WO | WO 96/34968 | 7/1996 |
| WO | WO 97/11188 | 3/1997 |

OTHER PUBLICATIONS

Cornelissen and Vanderwiele, Nucleic Acid Research, 17:19–25 (1989), no month provided.
Hizukiri, S, et al., Die Stärk 22 Jahrg. (1970), no month provided/Nr. 10.
Hovenkamp–Hermlink, Potato Research, 31:241–246 (1988), no month provided.
Schierbaum, F., Die Stärk 21 Jahrg. (1969), no month provided/Nr. 87, (german language only).
Abel, G., et al., The Plant Journal, 10(6):981–991 (1996), no month provided.

*Primary Examiner*—David Brunsman
(74) *Attorney, Agent, or Firm*—Reed Smith, LLP

(57) ABSTRACT

The invention relates to a process for producing a pregelatinized starch having good gel-formation properties, in which
a) a suspension of starch and water is prepared,
b) the suspension prepared in a) is applied to a hot roller of a roller dryer, and
c) the pregelatinized starch obtained by process step b) s isolated.

According to the invention a potato starch having an amylose content of at least 30% by weight is used.

16 Claims, 1 Drawing Sheet

PREGELATINIZED STARCHES AND PROCESSES FOR THEIR PRODUCTION

FIELD OF THE INVENTION

The present invention relates to a process for producing pregelatinized starch and the pregelatinized starch obtainable by this process. It further relates to compositions comprising this pregelatinized starch, in particular dry mixtures for producing instant puddings. The present invention further relates to the use of the novel pregelatinized starches for producing foods, in particular instant puddings, feeds, adhesives and colorings.

BACKGROUND OF THE INVENTION

Pregelatinized starches are physically modified starches which are predominantly produced by wet-thermal digestion. In contrast to native starch, they form dispersions or pastes or gels with cold water, depending on the concentration of the pregelatinized starch used and depending on the type of starch used to produce the pregelatinized starch. On account of there properties a number of possible applications result for pregelatinized starches in the food industry and moreover in many technical fields The use of pregelatinized starch, which is also termed cold-swelling starch, instead of native starch has in many cases the advantage that production processes can be simplified and shortened.

In principle it is possible to produce cold-swelling starch (pregelatinized starch) by various processes, for example by wet-thermal treatment using a roller dryer, mechanical and thermal treatment with an extruder or exclusively mechanical treatment with the vibratory mill. All processes share the fact that, via energy transfer processes which are not known in more detail the grown starch grain structure and the para-crystalline molecular organization is disrupted and the starch is converted into an amorphous substance. Since in the case of the known processes the operating variables differ from one another qualitatively and quantitatively, products having differing properties result therefrom.

Industrial pregelatinized starch production is principally carried out Musing the roller dryer. Generally, in this case an approximately 35% strength starch-water suspension is applied to the surface of a heated roller of the roller dryer. On the roller surface the starch is nor only gelatinized but also dehydrated.

In order to impart cold-swelling properties to starch, the grain structure or paracrystalline structure of the starch must be disrupted during heating on the roller dryer (for example for <1 minute at approximately 100° C.). This achieves an intermediate state between that of a solid and a completely soluble substance. Another possibility in that instead of the starch-water suspension, a precooked starch paste is applied to the roller for drying.

In addition, various variants of the roller drying process are described in which the pregelatinization is carried out in the presence of additives such as salts, acids, lipids, etc. Indoor in which chemically modified starches are used as starting material.

To produce, for example, instant desserts and instant puddings, pregelatinized starches are required which after stirring into cold liquid, for example water or milk, form sliceable gels within a short time, for example in the case of a boiled pudding. These requirements are not met by the commercial pregelatinized starches of wheat, potato or corn starch. To achieve the abovementioned properties, in the case of the previously commercially available pregelatinized starches, additives to the pregelatinized starch such as gelatin, alginate, carrageenan and/or inorganic salts are required.

SUMMARY OF THE INVENTION

Thus an object underlying the present invention is to provide pregelatinized starches which after stirring into a cold liquid at a certain concentration after a short swelling period form sliceable gels.

This object is achieved by the inventive process, since it has surprisingly been found that, on the basis of potato starches which, compared with conventional potato starches, have an elevated amylose content, and roller drying, pregelatinized starches can be produced which form sliceable gels after a short swelling period.

Potato starches in contrast to the cereal starches, contain glucose units having phosphate ester, groups which impart specific functional properties to them. The phosphate content of cereal starches results from the content of phospholipids which do not occur in potato starch. The predominant amount of phosphate ester groups of the potato starch is bound to the amylopectin molecules, more precisely principally to the $C_6$ atom of the glucose units, the remainder predominantly in the $C_3$ position, at the least in the $C_2$ position (Schierbaum, F.: Stärke 21 (1969) 87: Hizukiri S. et at. Stärke 22 (1970) 338). From the functional aspect, the phosphate ester group content primarily influences the pasting behavior of the starch; the pasting temperature decreases, the peak viscosity increases, in addition it reduces the tendency to retrogradation of boiled samples and paste and improves their freeze-thaw stability.

The total phosphate content of conventional potato starch, depending on cultivar and cultivation conditions, is generally in the range 10–30 μmol of phosphate/g of starch and originates from the monophosphate ester groups, since the lipid content of potato starch is negligible.

From genetically modified potatoes, on the other hand, potato starches can be produced having total phosphate contents in the order of magnitude of 120 μmol of phosphate/g of starch.

The natural amylose content of conventional potato starches is generally in the order of magnitude of 20–25% by weight To achieve higher amylose contents the native starch must be subjected to enzymatic debranching, with short-chain amylose molecules being formed by debranching amylopectin molecules.

From genetically modified potatoes, on the other hand, potato starches can be produced having a content of natural (long-chain) amylose of greater than 30% by weight up to an order of magnitude of greater than 70% by weight.

Other starches, for example wheat or corn starch, have a higher content of native amylose, but on the other hand only a very low (wheat starchy or negligible (corn starch) Content of phosphate ester groups.

It has now been found that although a high amylose content of a scorch favors gel formation of the pregelatinized starch produced from the starch, the pasting temperature of the starch is increased and thus the starch digestion and formation of the pregelatinized starch is made more difficult, but on the other hand the phosphate ester content of the starch counteracts this.

Therefore, the invention teaches using potato starch which a d high content of phosphate ester groups, but a potato starch having an elevated amylose content compared with potato starch from wild-type plants. The potato starch, in contrast to cereal starches, contains no lipids which form complexes with amylose and thus would impede gel formation and/or paste formation of the pregelatinized starch.

In addition, it has been found that, by spray-drying a product is obtained which has a high content of unwanted soluble carbohydrates. That according to the invention roller drying is provided. In contrast to high-amylose starches from corn which, under standard conditions, do not gelatinize on the roller, potato starches having an elevated amylose content compared with potato starch from wild-type plants is suitable for roller drying.

U.S. Pat. No. 3,607,394 discloses the production of pregelatinized starch by heat treating an aqueous suspension of a starch which contains at least 50% amylopectin and roller drying or spray drying. The resultant pregelatinized starch is said to form smooth pastes and have minimum tendency toward viscosity increase on standing. In addition, it is mentioned that high-amylose starches, which in the case of U.S. Pat. No. 3,607,394 means those starches which contain 60% or more amylose, give products which on reconstitution with water form gels which do not have the desired texture. With respect to the type of starch to be used, no critical differentiation is made. Spray drying is also recommended, which leads to an undesirably high content of soluble carbohydrates.

EP 480 433 A2 discloses foods containing soluble high-amylose starches selected among i) spray-dried non-granular starches, ii) spray-dried gelatinized starches and iii) enzymatically debranched gelatinized starches containing at least 40% short-chain amylose. These foods are said to be distinguished by the formation of strong gels. Corn starches and pea starches are the only types of starches which are mentioned and a special starch digestion (jet cooking) is required. It is explicitly mentioned that known high-amylose starches require higher cooking temperatures than other starches. Roller drying is termed unsuitable, except for starches having enzymatically debranched soluble high-amylose starches.

In contrast thereto, the present invention uses a potato starch having a high content of native long-chain amylose.

Short-chain amylose is taken to mean that having a maximum chain length $DP_{max}<100$. long-chain amylose is taken to mean that having a maximum chain length $DP_{max}=$ 150 to 10 000.

DETAILED DESCRIPTION OF THE INVENTION

Figure 1:
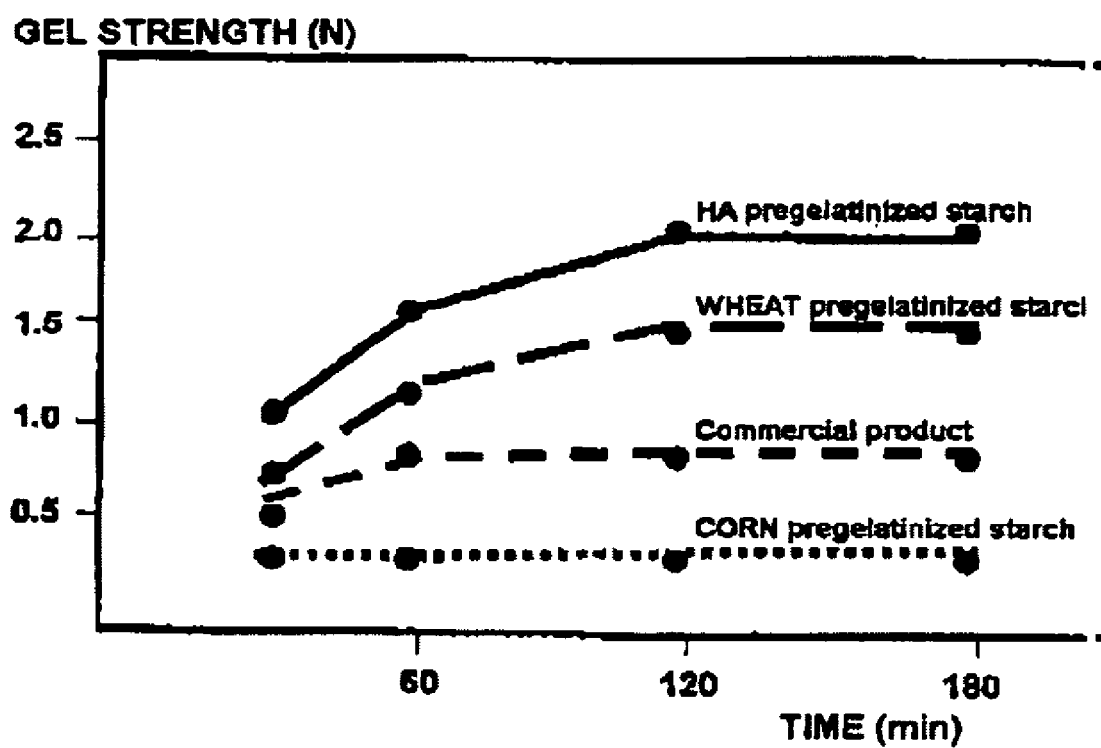
FIG. 1 shows the effect of time on strength pregelatinized starch pudding and an instant pudding prepared from the commercial product (Texture Analyser).

The present invention therefore relates to a process for producing a pregelatinized starch having good gel formation properties in which
a) a suspension of starch and water is prepared,
b) the suspension prepared in a) is applied to a hot roller of a roller dryer; and
c) the pregelatinized starch obtained by process step b) is isolated.
in which the process according to the invention comprises using a potato starch having an amylose content of at least 30% by weight.

The term "pregelatinized starch", in the context of The present invention, is taken to mean a physically modified starch which, in contrast to native starch, forms dispersions, pastes or gels with cold water or cold milk depending on the concentration of the pregelatinized starch used.

The term "hot roller" in the context of the present invention is taken to mean a roller of a roller dryer which has a temperature of at least 100° C. preferably between 120° C. and 200° C., in particular between 140° C. Band 180° C. and particularly preferably between 150° C. and 170° C.

Roller dryers for producing gelatinized scorch are known to those skilled in the art and have been described, for example, in Starch: Chemistry and Technology. Vol. II, Academic Press New York. San Francisco, London (1967) edited by R. L. Whistler and E. F. Paschall. For example, in the context of the present invention, a steam-heated single-cylinder dryer having one or more feed rollers (roller diameter approximately 500–800 mm) can be used. However, other roller dryers can also be used, for example electrically heated single-cylinder dryers having roller diameters of approximately 160 mm.

The potato starches used in the context of the present invention have an amylose content of at least 30%. in particular 30%–85%. for example 30%–65%, or 32%–55%, preferably 32%–45%.

In the context of the present invention, the anylose content is determined preferably via the calorimetric determination of armylone content described by Hovenkamp-Hermelink (Potato Research 31. (1988), 241–246).

Preferably, in process step a) of the inventive process, a suspension of potato starch and water is prepared in a concentration range of 5 percent by weight (=% by weight) to 50% by weight, preferably from 10% by weight to 40% by weight, in particular from 15% by weight to 35% by weight, particularly preferably from 20% by weight to 30% by weight.

The potato starch used in process step a) shall have a total phosphate content of 5–120 µmol of phosphate/g of starch, preferably 10–120 µmol of phosphate/s of starch, of 15–110 µmol of phosphate/g of starch, and particularly preferably 60–110 µmol of phosphate/g of starch.

The term "total phosphate content" of the starch is taken to mean in the context of the present invention the content of covalently bound phosphate in the form of starch phosphate monoesters in the C2, C3 and C6 position of the glucose units. The content of phosphorylated non-glucans, for example phospholipids, is not encompassed by the term "total phosphate content".

Wild-type potato plants generally synthesize a starch having an amylose content of approximately 17% to 23%

(amylose content determined according to Hovenkamp-Hermelink). The potato starches used in the context of the present invention having an amylose content of at least 30% may be isolated, for example, from transgenic potato plants.

Potato starches from plants having decreased gene expression of BEI (=branching enzyme I), of BEII (=branching enzyme IS) and of SSIII (=soluble starch synthase III) gene are in principle particularly highly suitable for producing inventive pregelatinized starches.

Transgenic potato plants which synthesize a starch which is particularly suitable for the present invention having high amylose contents and high phosphate contents are disclosed in the applicant's German patent application filed on Dec. 19, 2002.

However, the use of potato starches of other origins is also conceivable, provided that these have an amylose content of at least 30%.

International patent application WO 97/11188 describes transgenic potato plants which, as a result of the antisense inhibition of the R1 gene and of the BEI gene, synthesize a starch having an amylose content of approximately 30% to 70%, the amylose content having been determined by the method of Hovenkamp-Hermelink (Potato Research 31. (1988), 241–246). The phosphate content of these potato starches is reduced compared with the phosphate content of :starch from wild-type plants.

In a preferred embodiment of the invention, the potato starch used in the inventive process originates from potato plants which have altered gene expression of the R1 and BEI gene compared with corresponding wild-type plants (see WO 97/11188).

Compared with corn starches having amylose contents of approximately 50% (Gelose®) or 70% (Hylon VII®), the potato searches used in the context of the present invention have the advantage that they can be sufficiently digested using the roller dryer. In the case of corn starches having amylose contents of approximately 50% and 70% the digestion with the roller dryer is inadequate, so that products produced by roller drying do not form pastes or gel on stirring with cold water in the relevant concentration range.

In process step b) of the inventive process, the starch suspension is applied to the hot roller of the roller dryer for preferably between 2 seconds (seconds=s) and 120 s, preferably between 3 s and 60 s, in particular between 3 s and 30 s, and particularly preferably between 5 s and 20 s.

The isolated pregelatinized starch, following process step c), is preferably cooled, preferably cooled in air, and/or is then comminuted, for example using a mill.

In an embodiment of the inventive process, the suspension produced in process step a), before it is applied to the hot roller of the roller dryer, is partially or completely gelatinized.

The term "completely gelatinized" is taken to mean in the context of the present invention that the starch suspension, before being applied to the roller, is heated for a defined time, for example for 5 minutes, to a defined temperature, for example 95° C., until the structure of the starch grains has broken down and at least 80%, preferably 90%, of the starch grains no longer show light birefringence in the light microscope under polarized light.

The proportion of starch grains which do not show birefringence in the light microscope under polarized light can be determined in this case using a microscope under polarized light, as described, for example, in Eberstein et al., Starch/Stärke 32. (1980), 397–404.

The term "partially gelatinized" is taken to mean in the context of the present invention that the starch suspension, before it is applied to the roller, is heated for a defined time, for example for 5 minutes, to a defined temperature, for example 65° C, until the formation of a starch paste begins and the structure of the starch grains has broken down and 25%–60%, preferably 30%–50%, of the starch grains no longer show birefringence in the light microscope under polarized light.

The proportion of starch grains which do not show birefringence in the light microscope under polarized light can here also be determined using a microscope under polarized light, as described, for example, in Eberstein et al., Starch/Stärke 32. (1980). 397–404.

The present invention also relates to a pregelatinized starch which is obtainable by the inventive process.

The invention further relates, to a composition comprising an inventive pregelatinized starch.

The term "composition" in the context of the present invention shall be taken to mean a mixture which comprises, inter alia, the inventive pregelatinized starch.

For example, the term composition encompasses baking mixes, mixes for producing confectionery, instant puddings, instant deserts, fruit fillings, cold creams or sauce. In addition, the term "composition" comprises mixtures for producing feeds, laundry starch, colorings and/or adhesives.

In a particularly preferred embodiment, the present invention relates to the production of an instant pudding based on the inventive pregelatinized starch and to the instant pudding which can be produced using the inventive pregelatinized starch.

The invention thus also comprises a process for producing instant pudding, in which
a) an inventive composition comprising the inventive pregelatinized starch is homogeneously mixed in a liquid;
b) the mixture produced in process step a) is allowed to stand until gel formation occurs.

In a particularly preferred embodiment of the invention, the liquid is milk and/or water.

The pregelatinized starch in process step a) is used in a concentration range of 2% by weight to 15% by weight, preferably from 4% by weight to 12% by weight, and particularly preferably from 5% by weight to 9% by weight.

The temperature in process step a) of the process for producing instant pudding can be 5° C. to 50° C. preferably 10° C. to 30° C. and particularly preferably 15° C. to 25° C.

The temperature in process step b) of the process for producing instant pudding is –15° C. to 50° C., preferably 0° C. to 35° C., and particularly preferably room temperature 15° C. to 30° C. in particular 20° C. to 25° C.

In addition to the pregelatinized starch, the inventive composition, in the context of producing instant pudding, can comprise other ingredients, for example sugar and/or $CaCl_2$ and/or flavorings and/or common salt and/or colorings and/or vegetable fat and/or emulsifiers and/or other pregelatinized starches.

The invention thus also relates to a dry mixture for producing instant pudding comprising 2–15% by weight, preferably 5–9% by weight, of an inventive, pregelatinized starch, and sugar and flavorings and if appropriate other additives customary in puddings.

In addition to the inventive pregelatinized starch, no other gelling agents are necessary, for example alginate and/or carrageenan and/or gelatin.

In contrast to conventional compositions for producing instant pudding, the inventive compositions in this embodiment of the invention have the advantage that they can be mixed, for example, in water or in milk, without additional heating, preferably at room temperature and without adding gelling agents, for example alginate and/or carrageenan and/or other hydrocolloids, form shape-stable, breakable and sliceable gels.

Compared with conventional compositions for producing instant pudding, the inventive compositions have in addition the advantage that solid gels, preferably sliceable gels, form even after a short standing time.

In the context of the present invention, the term "solid gels" is taken to mean a gel strength of at least 0.8 N, preferably at least 1.0 N, in particular between 1.1 N and 4.5 N, preferably between 1.2 N and 4.0 N and particularly preferably between 1.3 N and 3.6 N, more precisely at a starch concentration used of 6.8% by weight in aqueous solution with addition of sugar and $CaCl_2$. The gel strength is determined in this case using a texture analyzer as described below.

In the context of the present invention, the term "short standing time" is taken to mean a standing time at 15° C. to 25° C., preferably at 20° C. and atmospheric pressure of less than 3 h, preferably less than 2 h and particularly preferably less than 1 h.

A further advantage of the inventive compositions is that in comparison with conventional compositions for producing instant puddings, they form gels which are distinguished by high shape stability.

In a prepared embodiment of the present invention, the inventive compositions, in water or milk, form gels which have a high shape stability.

The term "high shape stability" in the context of the present invention shall be taken to mean a shape stability of at least 80%, preferably at least 85%, in particular at least 90%, and particularly preferably at least 95%.

The method for determining the shape stability is described below.

The inventive instant pudding in distinguished by a sliceable texture and/or by a high stability of the gel structure and/or by a high homogeneity of the gel.

In addition the present invention relates to the use of the inventive pregelatinized starch or of the inventive compositions comprising such pregelatinized starch for producing foods, food compositions or food precursors, in particular for producing bakery products and confectionery, instant puddings, instant desserts, fruit fillings, dessert powders, cold cream powders or sauce powders, in addition for producing feeds, preferably as a component for milk replacement feed, in addition for producing laundry starch, as an additive to colorings, as adhesive for paper and cardboard and/or as binder for barbecue charcoal.

METHODS

1. Determination of Solubility and the Corrected Water Binding Capacity of Pregelatinized Starch The solubility and water binding capacity of the pregelatinized starch was determined at room temperature (23±2° C.) following the procedure described by Richter, Augustat and Schierbaum (Ausgewählte Methoden der Stärkechemie [Selected methods in starch chemistry]. Wiss. Verlagsgesellschaft mbH. Stuttgart (1968). 111).

0.5 g of pregelatinized starch dry matter was weighed into a centrifuge tube (100 ml), wetted with 1 ml of ethanol, then dispersed or swollen for 30 min using 40 ml of distilled water using a magnetic rod and a stirring apparatus, then the magnetic rod was removed, rinsed with 10 ml of distilled water, and then the mixture was centrifuged for 10 min (2 800×g). The supernatant was filtered (fluted filter), of the filtrate, 10 g was placed in a weighing dish and dried overnight at 105° C. and thereafter the sediment was weighed.

Solubility was calculated according to the formula:

$$\text{Solubility}(\%) = \frac{\text{Filtrate evaporated to dryness }(gDM) \times 50 \times 100}{\text{Weight of starch }(gDM) \times 10}$$

The water binding capacity (WBC) was calculated from the formula:

$$WBC(g/g) = \frac{\text{Sediment }(g) - \text{weight of starch }(gDM)}{\text{Weight of starch }(gDM) \times 10}$$

The water binding capacity ($WBC_{corr}$) corrected for solubility was calculated from the formula:

$$WBC_{corr}(g/g) = \frac{[\text{Sediment }(g) - \text{weight of starch }(gDM)] \times 100}{\text{Weight of starch }(gDM) \times [100 - \text{solubility}(\%)]}$$

2 Determination of Gel Strength of the Pudding

The gel strength was measured using a Texture Analyser (TA, XT2 Stable Mikro Systems. Haslemere, surrey GU 27 3AY, GB). A pudding mixed at room temperature (23±2° C.) produced from 4.0 g of pregelatinized starch. 5.0 g of sugar, 50 ml of water and 50 ml of mill and also 0.1 g of $CaCl_2$ was immediately after preparation transferred to a cylindrical vessel of two rings lying one above the other (each 20 mm high; Ø=25 mm,) and then stored for two hours in a refrigerator (8–10° C.). The gel strength was measured by single compression of the gel using a planar compressing head (Øm 24.5 mm) A flat gel surface was obtained by cutting through the gel between the two rings with a knife.

Measurement Conditions:

Graph Type: F Force v Time
Force Threshold: 0.196 N
Contact Area: 471 mm²
Contact Force: 0.0490 N
Mode: Measure Force in Compression
Option: Cycle until Count
Force Unit: Newton
Test Speed: 2.0 mm/s
Distance: 1.0 mm
Trigger Force: 0.097 N

3. Determination of the Viscosity Properties Using a Rapid Visco Analyzer (RVA)

In the determination of the viscosity properties using the Rapid Visco Analyser (RVA) (Rapid Visco Analyser. Newport Scientific Pty Ltd, Investment Support Group, Warriewood NSW 2102, Australia), a suspension of 2 g of potato starch in 25 ml of water was subjected to the following heating program: suspend for 60 s at 50° C. heat from 50° C. to 95° C. at 12°/min, keep constant for 2.5 minutes, cool to 50° C. at 12° C./min and then keep constant for 2 minutes. The RVA temperature profile gave the viscometric parameters of the starches studied for the maximum (Max) and final viscosity (Fin), the pasting temperature (T), the minimum viscosity (Min) occurring after the maximum viscosity and the difference between minimum and final viscosity (Setback. Set).

4. Determination of Shape Stability (Firmness)

A pudding mixed at room temperature (23±2° C.) was immediately after preparation transferred into a Plexiglas cylinder (20 mm high; Ø=25 mm) lined with a polypropylene film, the surface was smoothed, then placed for 90 min in the refrigerator (8–10° C.) for gelation. Then, the cylindrical vessel (support ring) was removed, and after 5 min the height of the pudding was measured and the shape stability was calculated as follows:

$$\text{Shape stability (\%)} = \frac{B \times 100}{A}$$

A = Height of the support ring

B = Height of the pudding after removing the support ring

5. Determination of Total Phosphate Content of the Starch

The total phosphate content was determined using the methods of Ames (Methods in Enzymology VIII. (1966), 116–118).

For this approximately 50 mg of starch was admixed with 30 µl of ethanolic magnesium nitrate solution and ashed for three hours at 500° C. in a muffle furnace. The residue is admixed with 300 µl of 0.5 M hydrochloric acid and incubated for 30 min at 60° C. An aliquot is then made up to 300 µl of 0.5 M hydrochloric acid, added to a mixture of 100 µl of 10% strength ascorbic acid and 600 µl of 0.42% ammonium molybdate in 2 M sulfuric acid and incubated for 20 min after 45° C.

Photometric determination was carried out at 820 nm using a calibrated phosphate series as standard.

The examples below illustrate the invention:

EXAMPLE 1

Production of Pregelatinized Starch from High-Amylose Potato Starches

To produce pregelatinized starch, potato starch having an amylose content of approximately 35%–45% (amylose content determined in accordance with Hovenkamp & Hermelink) which has been obtained from transgenic potato plants having simultaneously reduced gene expression of the R1 gene and the branching enzyme I gene (as described, for example, in international patent application WO 97/11188 A1) and which shall be termed below HA starch was physically modified using a roller dryer.

To produce the pregelatinized starch, a crepe maker from La Monferrina. Italy, model C was used. This is an electrically heated single-cylinder dryer having a roller diameter of approximately 160 mm which was operated at a speed of 3 revolutions per minute (=rpm) and a roller temperature between 160° C. and 190° C. The residence time of the starch suspension on the roller is approximately 12 seconds at a speed of rotation of 3 rpm. The product was taken, off from the roller before the roller had made a complete revolution.

The pregelatinized starch was produced using the modified crepe maker by applying the starch suspension using a feed shaft to the hot roller surface. The product film was taken off- using a knife, cooled in air, equilibrated in the open overnight, then comminuted using a mill (model ZM 100, screen rim 0.2 mm) from Retsch GmbH & Co KG (Haan, Germany) at 10 000 rpm.

The pregelatinized starch was produced using a 12.5% strength starch Suspension which had been applied to a 160–190° C. roller. In the feed shaft the starch had in each case been partially pregelatinized

EXAMPLE 2

Production of an Instant Pudding 4.0 g of pregelatinized starch produced from HA potato starch (example 1), 5.0 g of icing sugar, 0.1 g of $CaCl_2$ were mixed homogeneously then added together with 50 ml of whole milk (3.5% fat) to a glass beaker and stirred at the highest speed using a Krupps 3-Mix (individual whisks from Krupps (Germany) for 3 min This mixture was then allowed to stand for 2 hours in the refrigerator at temperatures between 8° C. and 10° C. before the gel strength was determined using the method described above.

The commercial product for producing instant puddings which was used for comparison in the studies contained, according to the manufacturer's data, the following ingredients: sugar, modified starch, hardened vegetable fat, glucose syrup, emulsifier (esterified mono- and diglyceride), milk protein, thickener (carrageenan, alginate), common salt, coloring (carotene, riboflavin) flavoring. It was prepared in accordance with the manufacturer's instructions by mixing 12.0 g of the commercial product in 50 ml of milk.

The thickening of the commercial product is primarily based on the gelation of the alginate end carrageenan. The declared modified starch, a pregelatinized starch, is added as filler or for producing "body". In contrast thereto, for the gelation in the case of the pudding containing pregelatinized starch from high-amylose potato starch varieties (HA) no addition of the abovementioned hydrocolloids was needed.

In comparison with the commercial product (table 1), the instant puddings which had been produced on the basis of pregelatinized starches from high-amylose potato searches (example 1: HA starch) are distinguished in particular by a characteristic sliceable texture of the pudding.

TABLE 1

Gel strength and structure of pudding samples cold-mixed in milk from HA pregelatinized starch compared with a commercial product

| SAMPLE | GEL STRENGTH | STRUCTURE DESCRIPTION |
| --- | --- | --- |
| HA | 2.0 N | GEL SOFT. HOMOGENEOUS. SLICEABLE |
| Commercial product | 0.7 N | GEL NOT SLICEABLE |

Further studies of the properties of the pregelatinized starch from the potato starch HA were directed toward describing in more detail the rheological properties of a pudding produced therewith, such as the gel-formation rate, the viscous traction, the elasticity and plasticity of the pudding, and comparing these with those prepared from commercial starches or commercial products.

The gel strength of identically produced pudding samples (production was carried out as described above for the pudding made of HA pregelatinized starch) which had been produced from pregelatinized starches of differing origins was measured using the Texture Analyser at room temperature after various standing times. From FIG. 1, it can first be seen from the increase with time in gel strength of the pudding samples that the maximum gel strength was achieved more rapidly the lower was the viscosity of the preparation and that in the case of the stronger gels it increased up to two hours.

The pudding which was produced from pregelatinized starch from HA potato starch, in contrast to the control puddings, has a sliceable texture.

The sliceabilty of the texture may also be illustrated indirectly by determining the shape stability of the puddings by the method described above. If the shape stability is compared of puddings which were produced from various pregelatinized starch types, it can be seen that the puddings which were produced from pregelatinized starch from HA starch (see above for production), compared with puddings which had been produced in the same manner (4.0 g of pregelatinized starch. 5.0 g of icing sugar. 0.1 g of CaCl$_2$ in 50 ml of milk) from different pregelatinized starch types (corn pregelatinized starch, wheat pregelatinized starch, potato pregelatinized starch) have a significantly higher shape stability. The same applies in comparison with the pudding produced from the above-described commercial product.
Result:

| STARCH | SHAPE STABILITY |
| --- | --- |
| HA | 98% |
| CORN PREGELATINIZED STARCH | 71% |
| WHEAT PREGELATINIZED STARCH | 42% |
| POTATO PREGELATINIZED STARCH | 77% |
| COMMERCIAL PRODUCT | 80% |

The suitability of the individual pregelatinized starches for producing an instant dessert may be clearly differentiated from one another by sensory means. Another possibility is offered by graphic representation of the pudding samples which after mixing had been rested for two hours at room temperature and had then been demolded. On the basis of appearance and cut surface of the samples, it may clearly be seen that the desired sliceable structure was only achieved in the case of pudding having the pregelatinized starch from HA. This provides important verification for the unusual behavior of this starch, which apparently cannot be achieved using pregelatinized starches from other types of starch.

EXAMPLE 3

Production of Transgenic Potato Plants which have Decreased Gene Expression of a BEI, SSIII and a BEII Gone Production of the ME5/6 Expression Vector pGSV71 is a derivative of plasmid pGSV7 which is derived from the intermediate vector pGSV1. pGSV1 is a derivative of pGSC1700 whose construction has been described by Cornelissen and Vanderwiele (Nucleic Acid Research 17. (1989), 19–25) pGSV1 was obtained from pGSC1700 by deleting the carbenicillin resistance gene and deleting the T-DNA sequences of the TL-DNA region of plasmid pTiB6S3.

pGSV7 contains the origin of replication of plasmid pBR322 (Bolivar et al. Gene 2. (1977), 95–113) and the origin of replication of the *Pseudomonas* plasmid pVS1 (Itoh et al. Plasmid 11, (1984). 206). pGSV7 also contains the selectable marker gene aadA from the transposon Tn1331 from *Klebsiella pneumoniae*, which conveys resistance to the antibiotics spectinomycin and streptomycin (Tolmasky, Plasmid 24 (3), (1990). 218–226; Tolmasky and Crosa, Plasmid 29(1), (1993), 31–40) Plasmid pGSV71 was obtained by cloning a chimeric bar gene between the border regions of pGSV7. The chimeric bar gene contains the promoter sequence of cauliflower mosaic virus for initiating transcription (Odell et al., Nature 313, (1985), 180), the bar gene from *Streptomyces hygroscopius*, (Thompson et al., Embo J. 6. (1987), 2519–2523) and the 3'-untranslated region of the nopaline synthase gene of the T-DNA of pTiT37, for terminating transcription and polyadenylation. The bar gene gives tolerance to the herbicide glufosinate ammonium.

The T-DNA, at position 198–222, contains the right border, sequence of TL-DNA from the plasmid pTiB653 (Gielen et al., EMBO J. 3. (1984), 835–846). Between nucleotide 223–249 there is a polylinker sequence. The nucleotides 250–1634 contain the P35S3 promoter region of the cauliflower mosaic virus (Odell et al., see above). The coding sequence of the phosphinothricin resistance gene (bar) from *Streptomyces hygroscopius* (Thompson et al., 1987. see above) is present between the nucleotides 1635–2186.

The two terminal codons at the 5' end of the bar wild-type gene were replaced by the codons ATG and GAC. Between nucleotides 2187–2205 there is a polylinker sequence. The 260 bp-long TaqI fragment of the non-translated 3' end of the nopaline synthase gene (3' nos) from the T-DNA of plasmid pTiT37 (Depicker et al., J. Mol. Appl. Genct. 1, (1982), 561–573) is situated between the nucleotides 2206 and 2465. Nucleotides 2466–2519 contain a polylinker sequence. The left border sequence of the TL-DNA from pTiB6S3 (Gielen et al., EMBO J. 3. (1984). 835–846) situated between nucleotides 2520–2544.

The vector pGSV71 was then excised rising the enzyme PstI and blunted, The B33 promoter and the ocs cassette were excised as EcoRI-HindIII fragment from the vector pB33-Kan and blunted and introduced into the vector pGSV71 excised with PstI and blunted. The resultant vector served as starting vector for constructing ME5/6 into the PstI cleavage site situated between B33 promoter and ocs element of the vector ME4/6 an oligonucleotide was introduced which contains the cleavage sites EcoRI, PacI, SpeI, SrfI, SpeI, NorI, PacI and EcoRI, doubling the PstI cleavage site. The resultant expression vector wan termed ME5/6.

Description of the Vector pSK-Pac:

pSK-Pac is a derivative of pSK-Bluescript (Stratagene, USA) in which a PacI cleavage site was introduced to each flank of the multiple cloning site (MCS).

Production of Transgenic Plants:

To produce transgenic plants which have a decreased activity of a BEI, an SSIII and it BEII protein, transgenic plants were first produced which have a decreased activity of a BEI and an SSIII protein. For this purpose the T-DNA of plasmid pB33-aBEI-aSSIII-Kan was transferred to potato plant by agrobacteria, as described in Rocha-Sosa et al. (EMBO J. 8, (1989), 23–29). To construct the plasmid pB33-aBEI-aSSIII-Kan, the expression vector pBin33-Kan was first constructed. For this the promoter of the patatin gene B33 from *Solanum tuberosum* (Rocha-Sosa et al., 1989, see above) was ligated as DraI fragment (Nucleotides—1512—+14) into the vector pUC19 excised with SstI (Genbank Acc. No. M77789), whose ends had been blunted using T4 DNA polymerase.

This gave the plasmid pUC19-B33. From this plasmid, the B33 promoter was excised using EcoRI and SmaI and ligated into the appropriately cut vector pBinAr. This produced the plant expression vector pBin33-Kan. The plasmid pBinAR is a derivative of the vector plasmid pBin19 (Bevan, Nucl. Acid Research 12, (1984). 8711–8721) and was constructed by Höfgen and Willmitzer (Plant Sci. 66. (1990), 221–230) A 1631 bp-long HindII fragment which contains a partial cDNA coding for the BEI enzyme from potato (Kossmann et al., 1991, Mol. & Gen. Genetics 230(1–2):39–44), was then blunted and introduced in the "antisense" orientation with respect to the B33 promoter (promoter of the patatin gene B33 from Solanum tuberosum; Rocha-Sosa et al. 1989) into the vector pBinB33 cleaved in advance with SmaI. The resultant plasmid was cleaved with BamHI. Into the cleavage site was introduced a 1363 bp long BamHI fragment containing a partial cDNA coding for the SSIII enzyme drum potato (Abel et al. 1996, loc. cit) likewise in the "antisense " orientation with respect to the B33 promoter.

After the transformation, various lines of transgenic potato plants were identified whose tubers had a markedly decreased activity of a BEI and SSIII protein. The plants resulting from this transformation were termed 038VL.

For detection of the activity of soluble starch synthases by non-denaturing gel electrophoresis, tissue samples of potato tubers were disrupted in 50 mM Tris-HCl pH 7.6. 2 mM DTT, 2,5 mM EDTA, 10% glycerol and 0.4 mM PMSF. Electrophoresis was carried out in a MiniProtean II chamber (BioRAD). The monomer concentration of the 1.5 mm-thick gels was 7.5% (w/v), and the gel and running buffer was 25 mM tris-glycine pH 8.4. Identical amounts of protein extract were applied and separated for 2 h at 10 mA per gel.

The activity gels were then incubated in 50 mM Tricine-NaOH pH 8.5, 25 mM potassium acetate, 2 mM EDTA, 2 mM DTT, 1 mM ADP glucose, 0.1% (w/v) amylopectin and 0.5 M sodium citrate. Glucans formed were stained using Lugol's solution.

BEI activity was also detected using the non-denaturing gel electrophoresis:

To isolate proteins from plants the sample material was ground in liquid nitrogen, taken up in extraction buffer (50 mM citrate, pH 6.5; 1 mM EDTA, 4 mM DTT) and, after centrifugation (10 min, 14 000 g, 4° C.), used directly for measuring protein concentration according to Bradford. Then, as required, 5 to 20 μg of total protein extract were admixed with 4-times loading buffer (20% glycerol, 125 mM tris HCl, pH 6.8) and applied to a "BE-activity gel". The running buffer (RB) was composed as follows: RB=30.2 g Tris base, pH 8.0, 144 g of glycine to 1 l of $H_2O$.

After completion of the gel run, the gels were each incubated overnight at 37° C. in 25 ml of "phosphorylase buffer" (25 ml of 1M Na citrate pH 7.0, 0.47 g of glucose-1-phosphate, 12.5 mg of AMP, 2.5 mg of phosphorylase a/b from rabbit). The gels were stained with Lugol's solution.

Further analyses showed that isolated starches from line 038VL008 and 038VL107 which had a reduction not only of BEI but also of the SSIII protein had the highest phosphate content of all independent transformants studied.

Plants of these lines were then transformed as described in Rocha-Sosa et al. (EMBO J. 8, (1989), 23–29) using the plasmid pGSV71-aBE2-basta (see international patent application PCT/EP02/06265).

Of the plants obtained by transformation with the plasmid pGSV71-aBE2-basta, which were termed 108CF and transformants were taken and their amylose content determined (Hovenkamp-Hermelink, Potato Research 31, (1988), 241–246). The starches of the independent lines whose tubers exhibited the highest amylose content were taken for further analysis of the starch properties. To demonstrate that these plants, in addition to a reduced activity of a BEI and SSIII protein, also had a reduced activity of a BEII protein, analysis was also carried out using the non-denaturing gel electrophoresis. Analysis was carried out using the same method as described above for analyzing the reduced BEI activity, with the difference that the non-denaturing polyacrylamide gel, in addition to the above-described composition, contained 0.5% maltodextrin (Beba, maltodextrin solution, 15% strength for neonatal infants, Nestle). By adding the dextrin, the differing activities of the BEI and BEII proteins were demonstrated in a gel by incubating the gels in "phosphorylase buffer " (25 ml of 1M Na citrate pH 7.0, 0.47 g of glucose-1-phosphate, 12.5 mg of AMP, 2.5 mg of phosphorylase a/b from rabbit overnight at 37° C. with subsequent staining using Lugol's solution.

EXAMPLE 4

Production of Pregelatinized Starch from High-Amylose Potato Starch having Elevated Phosphate Content and use of this Progolatinized Starch for Producing Instant Puddings The modified starch synthesized by the transgenic plants described in example 3, which starch is termed below "Ha-phosphate", has an amylose content between 32% and 38% and a phosphate content between 80.0 and 100 µmol total phosphate/g dry weight of the starch.

This starch was used, as described in example 1, to produce pregelatinized starch. The resultant pregelatinized starch was then used to produce an instant pudding. The pudding was produced as described in example 2.

The properties of the pudding can be described in a similar manner to example 2 as follows:

TABLE 2

Gel strength and structure of pudding samples cold-mixed in milk from HA-phosphate pregelatinized starch compared with a commercial product

| Sample | Gel strength | Structure description |
| --- | --- | --- |
| HA phosphate | 2.7 N | Gel sliceable. homogeneous |
| Commercial product | 0.7 N | Gel not sliceable |

The sliceable gels formed even after a relatively short standing time (approximately 30 minutes) under the experimental conditions described in example 2, occasionally even after 10 to 15 minutes.

If the shape stability of the HA-phosphate pregelatinized starches is considered, this is in the range described for the HA pregelatinized starch (example 2) an di s98%.

What is claimed is:

1. A process for producing a pregelatinized starch having good gel-formation properties comprising
   a) preparing a suspension of potato starch and water,
   b) applying the suspension prepared in step a) to a hot roller of a roller dryer, and
   c) isolating the pregelatinized starch obtained by process step b), wherein said potato starch has an amylose content of at least 30% by weight.

2. The process according to claim 1, wherein said potato starch has an amylose content between 30% and 85%.

3. The process according to claim 1, wherein said potato starch has an amylose content between 30% and 65%.

4. The process according to claim 1, wherein said potato starch has an amylose content between 32% and 55%.

5. The process according to claim 1, wherein said potato starch has an amylose content between 32% and 45%.

6. The process according to claim 1, wherein said potato starch has a total phosphate content of between 5 and 120 µmol of phosphate/g of starch.

7. The process according to claim 6, wherein said potato starch has a total phosphate content of between 60 and 110 µmol of phosphate/g of starch.

8. A pregelatinized starch produced by the process of claim 1.

9. A method of producing sliceable gels comprising:
   a) obtaining a pregelatinized starch as produced in claim 1, and
   b) mixing said pregelatinized starch with other components of the sliceable gels.

10. A method of producing foods comprising:
    a) obtaining a pregelatinized starch as produced in claim 1, and
    b) mixing said precgelatinized starch with other components of the foods.

11. A method of producing instant puddings comprising:
    a) obtaining a pregelatinized starch as produced in claim 1, and
    b) mixing said pregelatinized starch with other components of the instant puddings.

12. A method of producing feeds comprising:
    a) obtaining a pregelatinized starch as produced in claim 1, and
    b) mixing said pregelatinized starch with other components of the feeds.

13. A method of producing adhesives comprising:
    a) obtaining a pregelatinized starch as produced in claim 1, and
    b) mixing said pregelatinized starch with other components of the adhesives.

14. A method of producing colorings comprising:
    a) obtaining a pregelatinized starch as produced in claim 1, and
    b) mixing said pregelatinized starch with other components of the colorings.

15. A composition comprising pregelatinized starch produced by the process of claim 1.

16. A dry mix for producing an instant pudding comprising 2–15% by weight, preferably 5–9% by weight, of the pregelatinized starch produced in the process as claimed in claim 1, and sugar and flavorings and optionally further additives customary in puddings.

* * * * *